(12) United States Patent  
Nishimura

(10) Patent No.: US 7,809,328 B2  
(45) Date of Patent: Oct. 5, 2010

(54) BASE APPARATUS, MONITOR TERMINAL AND REPEATER APPARATUS

(75) Inventor: Masaki Nishimura, Saitama (JP)

(73) Assignee: Sony Corporation, Tokyo (JP)

(*) Notice: Subject to any disclaimer, the term of this patent is extended or adjusted under 35 U.S.C. 154(b) by 1107 days.

(21) Appl. No.: 11/491,739

(22) Filed: Jul. 24, 2006

(65) Prior Publication Data

US 2007/0019573 A1 Jan. 25, 2007

(30) Foreign Application Priority Data

Jul. 25, 2005 (JP) ............................... 2005-213858

(51) Int. Cl.
*H04B 7/15* (2006.01)
*H04B 3/36* (2006.01)

(52) U.S. Cl. ...................... 455/11.1; 370/293

(58) Field of Classification Search ........................ None
See application file for complete search history.

(56) References Cited

U.S. PATENT DOCUMENTS

2002/0028655 A1* 3/2002 Rosener et al. ............... 455/16

FOREIGN PATENT DOCUMENTS

| JP | 3 278727 | 12/1991 |
|----|----------|---------|
| JP | 6 261043 | 9/1994 |
| JP | 8 84373 | 3/1996 |
| JP | 9 9332 | 1/1997 |
| JP | 2001 156788 | 6/2001 |
| JP | 2003 51779 | 2/2003 |
| JP | 2003 124965 | 4/2003 |
| JP | 2003 249937 | 9/2003 |
| JP | 2003 304253 | 10/2003 |
| JP | 2005 184314 | 7/2005 |
| WO | WO 2005 065271 | 7/2005 |

* cited by examiner

*Primary Examiner*—Nick Corsaro
*Assistant Examiner*—Joel Ajayi
(74) *Attorney, Agent, or Firm*—Frommer Lawrence & Haug LLP; William S. Frommer

(57) ABSTRACT

A repeater for relaying communication between a base and a monitor which constitute a wireless LAN, includes a control means wherein, when reception quality of received data from the base by the monitor is lower than threshold in a direct communication mode in which the base and the monitor are communicating directly, the repeater is set as an indirect mode of relaying communication between the base and the monitor according to a request from the base based on a request from the monitor, and when reception level of a beacon received by the monitor from the base is equal to or greater than the threshold in the indirect communication mode in which the base and the monitor are communicating via the repeater, the repeater is set, according to a request from the monitor, as a non-indirect mode in which communication between the base and the monitor are not relayed.

5 Claims, 14 Drawing Sheets

BASE APPARATUS, MONITOR TERMINAL AND REPEATER APPARATUS

BACKGROUND OF THE INVENTION

1. Field of the Invention

The present invention relates to a base apparatus, a monitor terminal, and a repeater apparatus which constitute a wireless LAN system.

2. Description of the Related Art

As a wireless LAN system used in a residence etc., a system has been devised having a base apparatus which functions as an access point or a data source, such as receiving television broadcasting, accessing the Internet, etc., and a monitor terminal (display terminal) which receives a video image from the base apparatus by way of wireless communications with the base apparatus and data on the Internet, displays the video image and data on a display unit, such as a liquid crystal display etc., and performs a function of transmitting and receiving an e-mail via the base apparatus, etc.

In this system, a user can arrange the base apparatus fixedly in a suitable position, can carry the monitor terminal in arbitrary positions within an area which allows the communications with the base apparatus, and can perform the functions of receiving television broadcasting, accessing the Internet, and transmitting and receiving the e-mail by means of the monitor terminal at hand in arbitrary positions.

However, as a distance between the monitor terminal and the base apparatus increases, the received power in the monitor terminal becomes low, and a communication quality deteriorates, thus in some cases communications may not be available. Then, it is envisaged that communication between the base apparatus and the monitor terminal may be relayed by a repeater apparatus.

Patent document 1 (Japanese Patent Application Publication No. 2003-124965) discloses that a repeater apparatus for relaying wireless communication between apparatuses, such as two personal computers, is arranged to use a certain frequency band, for example, a 2.4 GHz band, for communication (data transmission and reception) with one device and use another frequency band, for example, the 5.2 GHz band, for communication (data transmission and reception) with the other device, to thereby raise use efficiency of frequency and avoid leakage between radio channels.

SUMMARY OF THE INVENTION

However, when the repeater apparatus is used, since electromagnetic waves transmitted from the repeater apparatus may be disturbance waves for other wireless apparatuses which are near the wireless LAN system including the repeater apparatus, it is not desirable that the repeater apparatus always relays the communication between the base apparatus and the monitor terminal. In addition, when the repeater apparatus is used, power consumption of the whole system increases.

Then, the present invention allows reduction of the possibility that the electromagnetic waves transmitted from the repeater apparatus may be the disturbance waves for other wireless apparatuses, thus also inhibiting the power consumption of the whole wireless LAN system from increasing.

The repeater apparatus of the present invention is a repeater apparatus for relaying communication between a base apparatus and a monitor terminal which constitute a wireless LAN system, the repeater apparatus including a control means wherein when a reception quality of data received from the base apparatus by the monitor terminal is lower than a threshold value in a direct communication mode in which the base apparatus and the monitor terminal are communicating directly, the repeater apparatus is set as an indirect mode of relaying communication between the base apparatus and the monitor terminal according to a request from the base apparatus based on a request from the monitor terminal, and when a reception level of a beacon received by the monitor terminal from the base apparatus is equal to or greater than the threshold value in the indirect communication mode in which the base apparatus and the monitor terminal are communicating via the repeater apparatus, the repeater apparatus is set, according to a request from the monitor terminal as a non-indirect mode in which communication between the base apparatus and the monitor terminal are not relayed.

In the wireless LAN system of the above structure having the repeater apparatus in accordance with the present invention, only when a communication situation between the base apparatus and the monitor terminal is worse, the communication between the base apparatus and the monitor terminal is relayed by the repeater apparatus. Alternatively, when a communication situation between the base apparatus and the monitor terminal is good, communication is directly performed between the base apparatus and the monitor terminal. Therefore, the possibility that the electromagnetic waves transmitted from the repeater apparatus may be the disturbance waves for other wireless apparatuses can be reduced, thus also inhibiting the power consumption of the whole wireless LAN system from increasing.

As described above, according to the present invention, it is possible to reduce the possibility that the electromagnetic waves transmitted from the repeater apparatus may be the disturbance waves for other wireless systems, thus also inhibiting the power consumption of the whole wireless LAN system from increasing.

BRIEF DESCRIPTION OF THE DRAWINGS

The present invention will become more readily appreciated and understood from the following detailed description of embodiments and examples of the present invention when taken in conjunction with the accompanying drawings, in which.

DESCRIPTION OF THE PREFERRED EMBODIMENTS

1. System and Example of Each Apparatus

FIGS. 1-5

Figure 1:
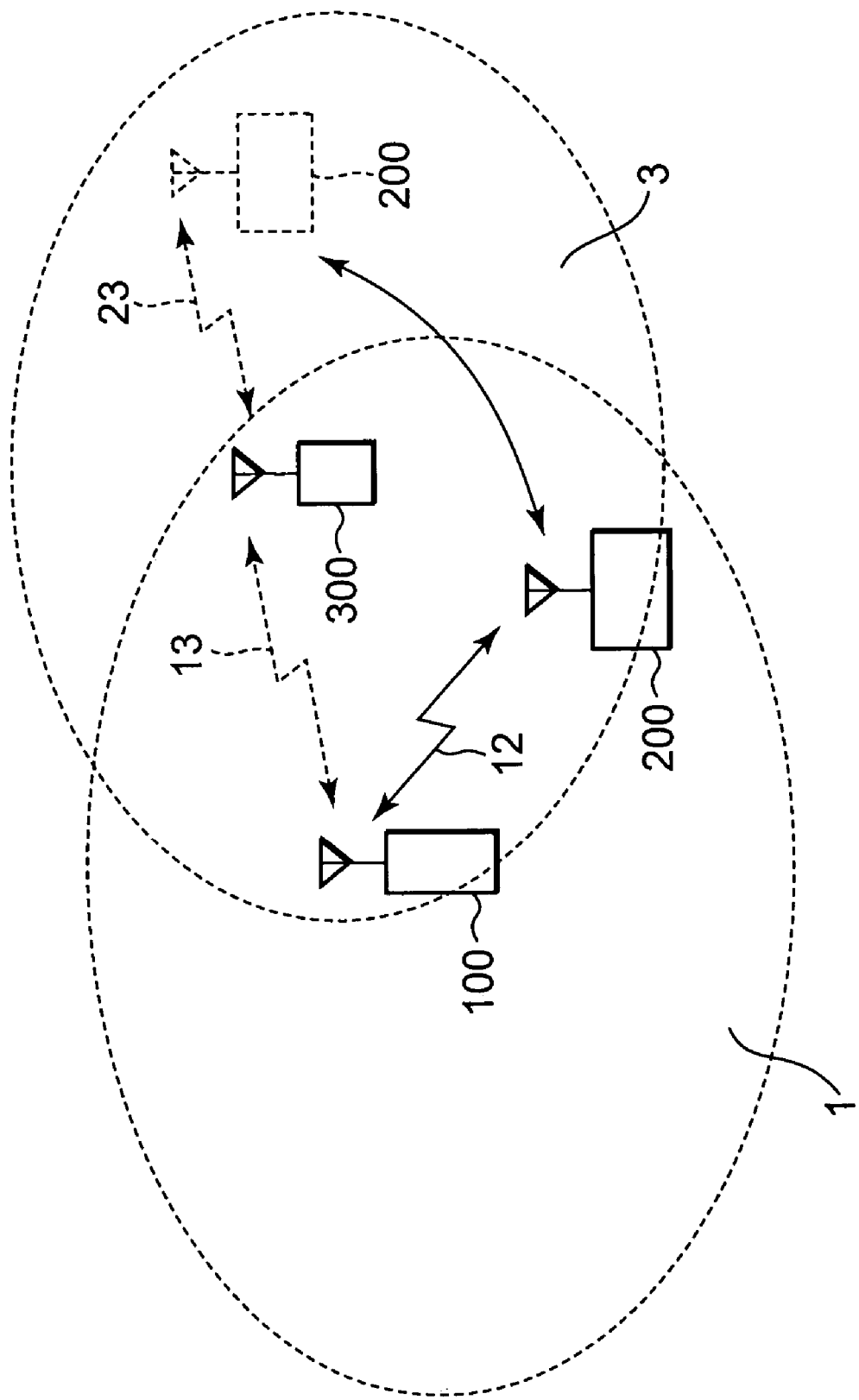
FIG. 1 is a block diagram showing a communication method in a wireless LAN system to which the present invention is applied.

(1-1. Example of Wireless LAN System: FIG. 1)

A wireless LAN system to which the present invention is applied is shown in FIG. 1.

This wireless LAN system is constituted by a base apparatus 100, a monitor terminal 200, and a repeater apparatus 300.

The base apparatus 100 is arranged to be fixed in a suitable position. The monitor terminal 200 is placed to a user at hand and carried by the user.

An area 1 is an area in which communication can be carried out directly within the base apparatus 100, and the repeater apparatus 300 is arranged in this area 1. An area 3 is an area in which communication can be carried out directly with the repeater apparatus 300.

According to the present invention, when the monitor terminal 200 as shown by a solid line exists in a position within the area 1, the wireless LAN system is in a direct communication mode, i.e., in a situation where communication is directly performed between the base apparatus 100 and the monitor terminal 200 as shown by a solid line arrow 12. When the monitor terminal 200 as shown by a broken line is outside the area 1 and exists in a position within the area 3, the wireless LAN system is in the indirect communication mode i.e. in a situation where the repeater apparatus 300 relays the communication between the base apparatus 100 and the monitor terminal 200 as indicated by broken line arrows 13 and 23.

In addition, a change from the direct communication mode to the indirect communication mode and a change from the indirect communication mode to the direct communication mode are automatically performed in the system without user's operation as will be described later.

Figure 2:
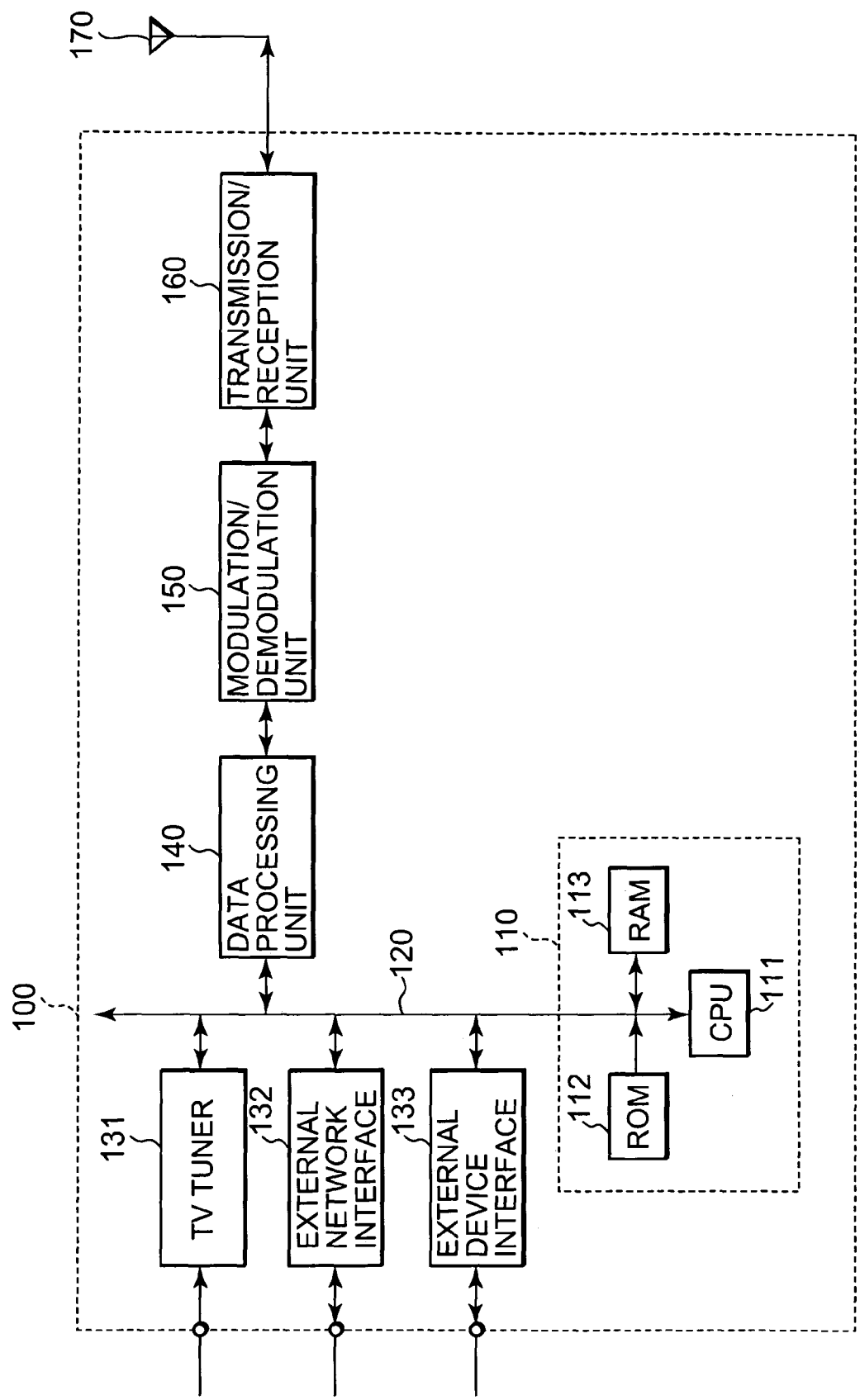
FIG. 2 is a block diagram showing an example of a base apparatus.

(1-2. Example of Base Apparatus 100: FIG. 2)

An example of the base apparatus 100 is shown in FIG. 2.

The base apparatus 100 is provided with a CPU 111, and its bus 120 is connected with a ROM 112 into which a program and data are written, a RAM 113 with which the program and data are implemented, etc., to thereby constitute a control unit 110.

Furthermore, the bus 120 is connected with a TV tuner 131 to which a TV (television) antenna is connected, an external network interface 132 for connecting to external networks, such as the Internet etc., and an external device interface 133 for connecting to external devices, such as a hard disk recorder, a DVD player, etc.

Further, the bus 120 is connected to a wireless communications unit including a data processing unit 140, a modulation/demodulation unit 150, a transmission/reception unit 160, and an antenna 170.

A MAC (Medium Access Control) address of the base apparatus 100 and MAC addresses of the monitor terminal 200 and the repeater apparatus 300, which constitute the wireless LAN system together with the base apparatus 100, are beforehand registered with the base apparatus 100 having the structure.

Figure 3:
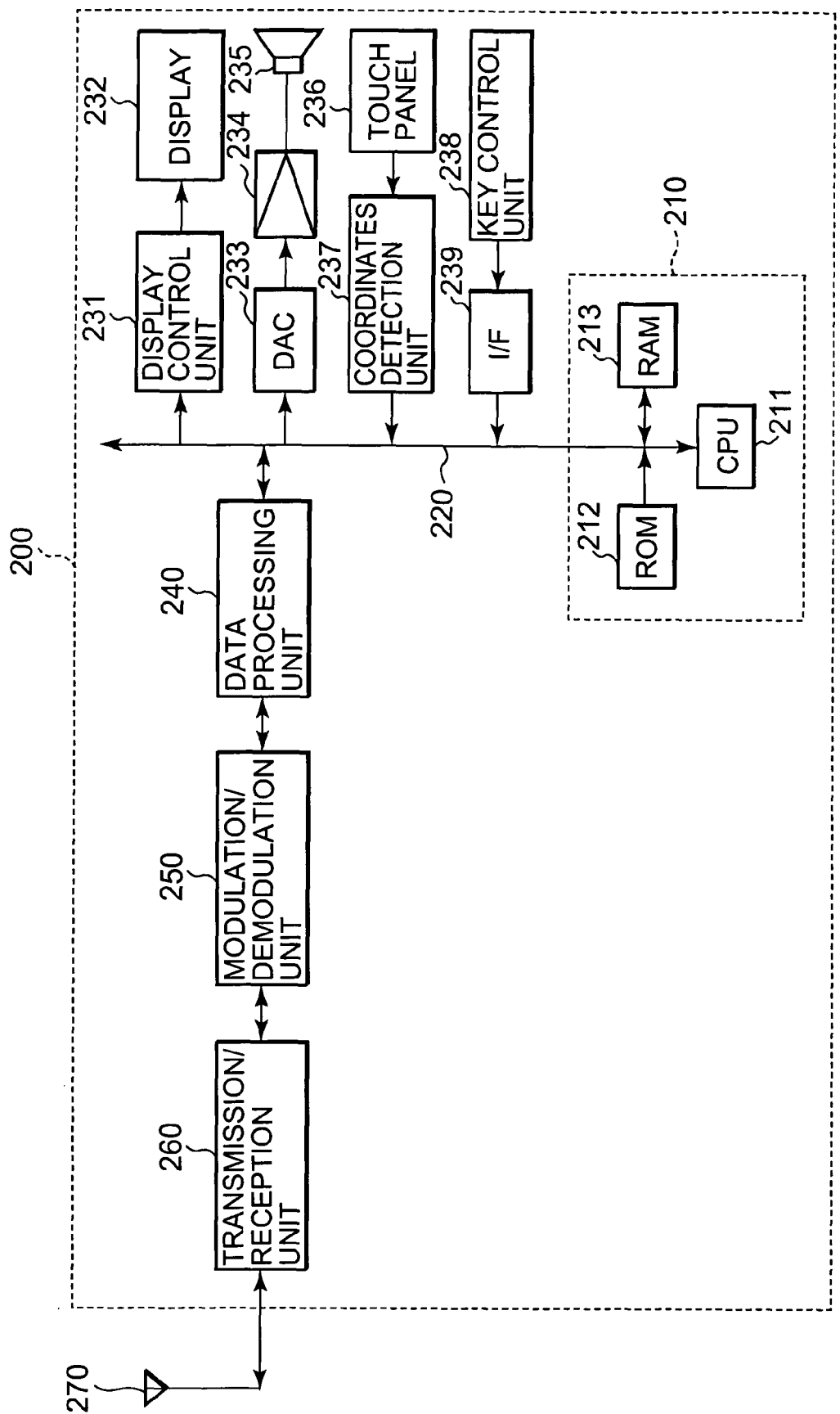
FIG. 3 is a block diagram showing an example of a monitor terminal.

(1-3. Example of Monitor Terminal 200: FIG. 3)

An example of the monitor terminal 200 is shown in FIG. 3.

The monitor terminal 200 is provided with a CPU 211, and its bus 220 is connected with a ROM 212 into which a program and data are written, a RAM 213 with which the program and data are implemented, etc., to thereby constitute a control unit 210.

Furthermore, the bus 220 is connected with a display 232, such as a liquid crystal display etc., via a display control unit 231, connected with a speaker 235 via a DAC (D/A converter) 233 and an audio amplification circuit 234, connected with a touch panel 236 via a coordinates detection unit 237, and connected with a key control unit 238 via an interface 239. The touch panel 236 is provided on a display screen of the display 232.

Further, the bus 220 is connected with a wireless communications unit including a data processing unit 240, a modulation/demodulation unit 250, a transmission/reception unit 260, and an antenna 270.

In the data processing unit 240, a reception quality received field strength and noise level) of the data received from the base apparatus 100 in the direct communication mode and a reception level of the beacon received from the base apparatus 100 in the indirect communication mode are detected as will be described later.

The MAC address of the monitor terminal 200 and the MAC addresses of the base apparatus 100 and the repeater apparatus 300 which constitute the wireless LAN system together with the monitor terminal 200 are beforehand registered with the monitor terminal 200 having the structure.

Figure 4:
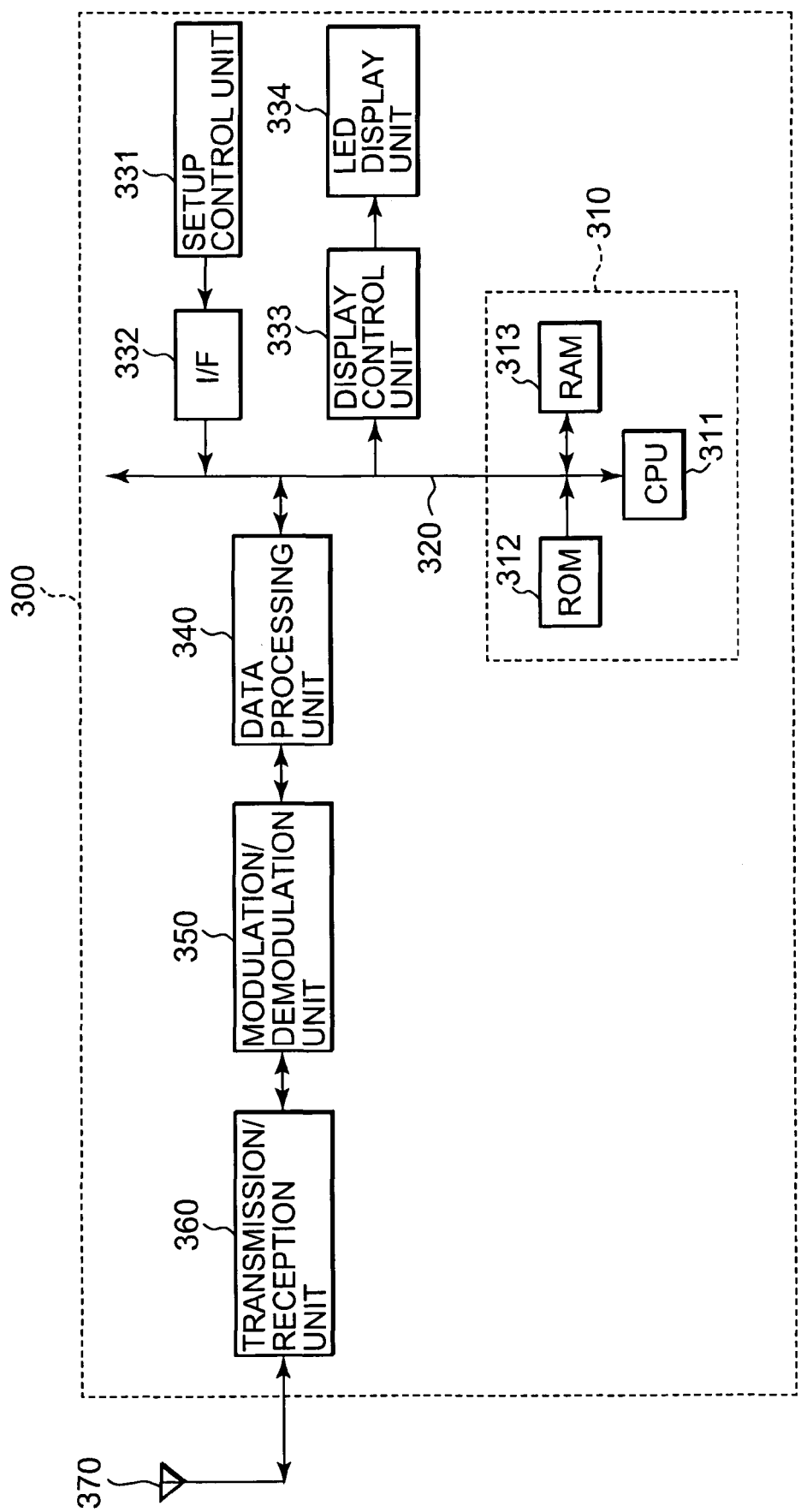
FIG. 4 is a block diagram showing an example of a repeater apparatus.
Figure 5:
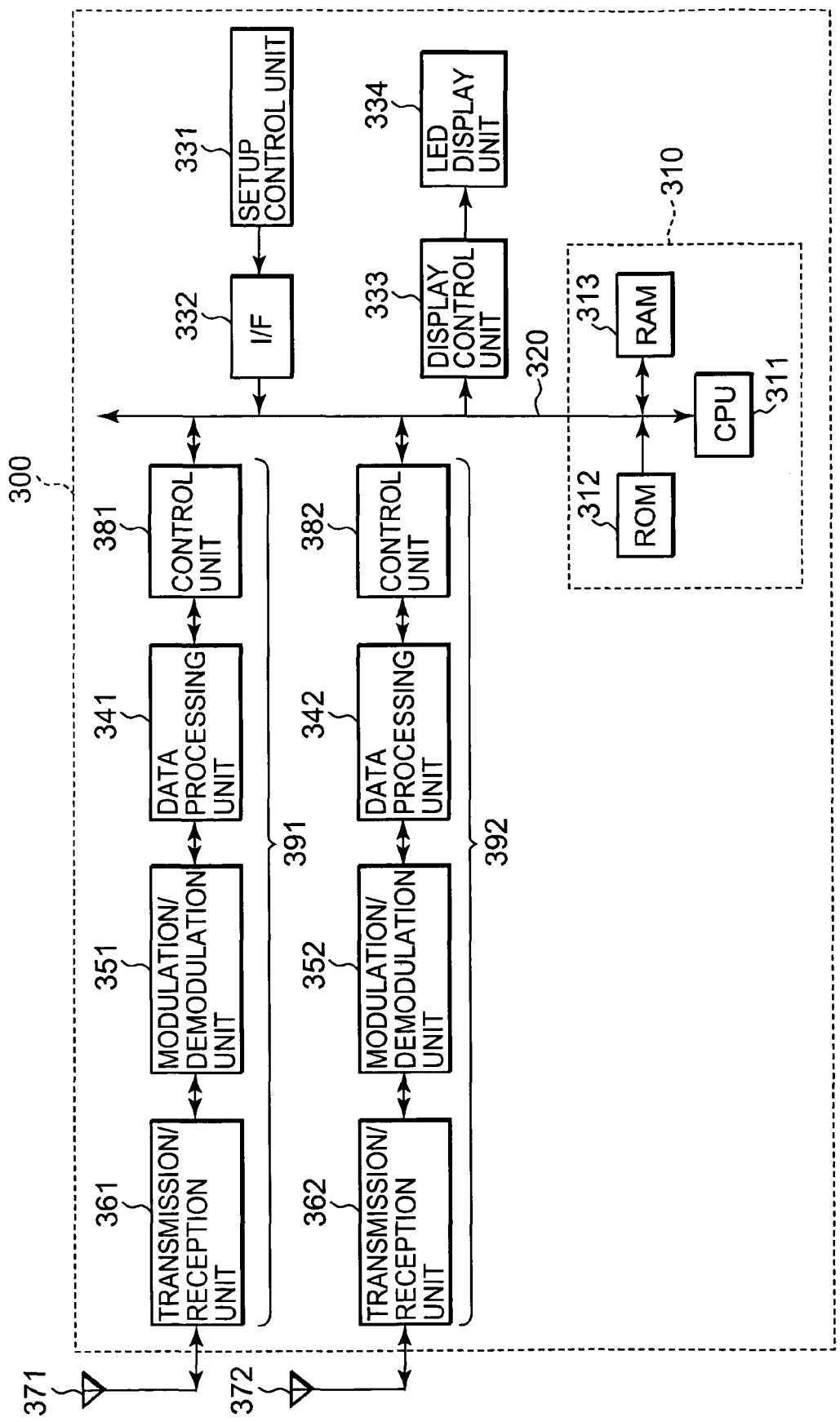
FIG. 5 is a block diagram showing another example of the repeater apparatus.

(1-4. Example of Repeater Apparatus 300: FIGS. 4 and 5)

An example of the repeater apparatus 300 is shown in FIG. 4.

The repeater apparatus 300 is provided with a CPU 311, and its bus 320 is connected with a ROM 312 into which a program and data are written, a RAM 313 with which the program and data are implemented, etc., to thereby constitute a control unit 310.

Furthermore, the bus 320 is connected with a setup control unit 331 via an interface 332, and connected with an LED (light emitting diode) display unit 334 via a display control unit 333.

Further, the bus 320 is connected with a wireless communications unit including a data processing unit 340, a modulation/demodulation unit 350, a transmission/reception unit 360, and an antenna 370.

The MAC address of the repeater apparatus 300 and the MAC addresses of the base apparatus 100 and the monitor terminal 200 which constitute the wireless LAN system together with the repeater apparatus 300 are beforehand registered with the repeater apparatus 300 having the structure.

The example of FIG. 4 shows a case where, by means of one wireless communications unit, the repeater apparatus 300 carries out communications with the base apparatus 100 and with the monitor terminal 200 at the time of the indirect communication mode. Therefore, data cannot be simultaneously transmitted to the base apparatus 100 and the monitor terminal 200, and a throughput between the base apparatus 100 and the monitor terminal 200 at the time of the indirect communication mode is about half a throughput between the base apparatus 100 and the monitor terminal 200 at the time of the direct communication mode.

Then, it is desirable that the repeater apparatus 300 is separately provided with a wireless communications unit for communication with the base apparatus 100 and a wireless communications unit for communication with the monitor terminal 200.

FIG. 5 shows an example in that case. In this example, the bus 320 is connected with a wireless communications unit 391 which is constituted by a control unit 381, a data processing unit 341, a modulation/demodulation unit 351, a transmission/reception unit 361, and an antenna 371, and a wireless communications unit 392 which is constituted by a control unit 382, a data processing unit 342, a modulation/demodulation unit 352, a transmission/reception unit 362, and an antenna 372.

The wireless communications unit 391 is for communication with the base apparatus 100, the wireless communications unit 392 is for communication with the monitor terminal 200, and a frequency channel can be changed between both.

In the example in this FIG. 5, the throughput between the base apparatus 100 and the monitor terminal 200 at the time of the indirect communication mode can be comparable with the throughput between the base apparatus 100 and the monitor terminal 200 at the time of the direct communication mode.

2. Communications Method in Wireless LAN System

FIG. 6-FIG. 15

Figure 6:
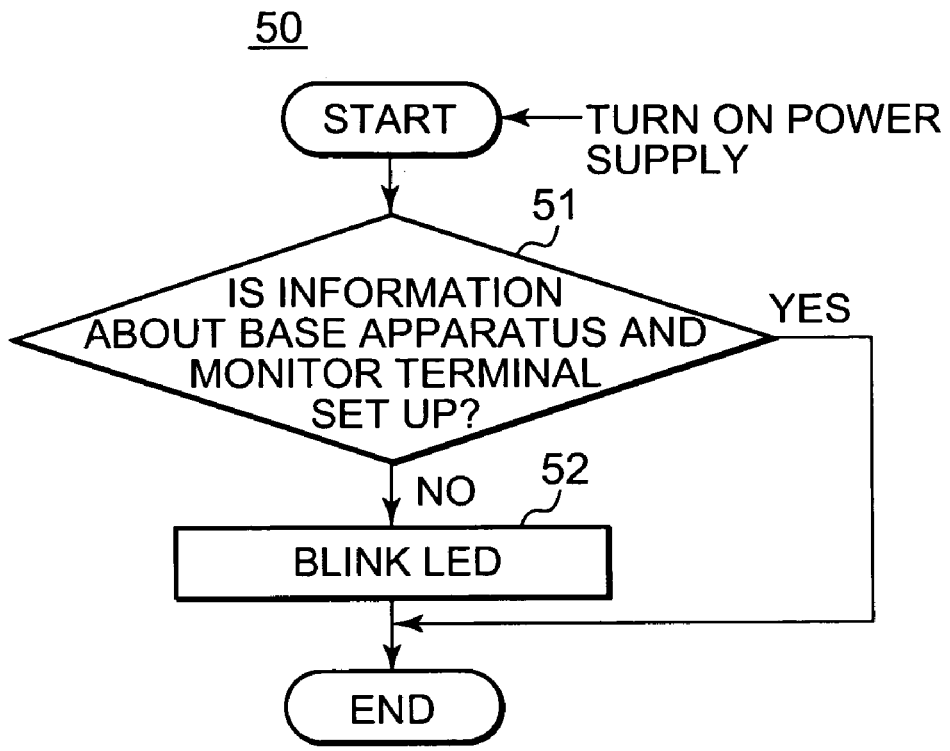
FIG. 6 is a flow chart showing an example of a setup check process carried out by the repeater apparatus.
Figure 7:
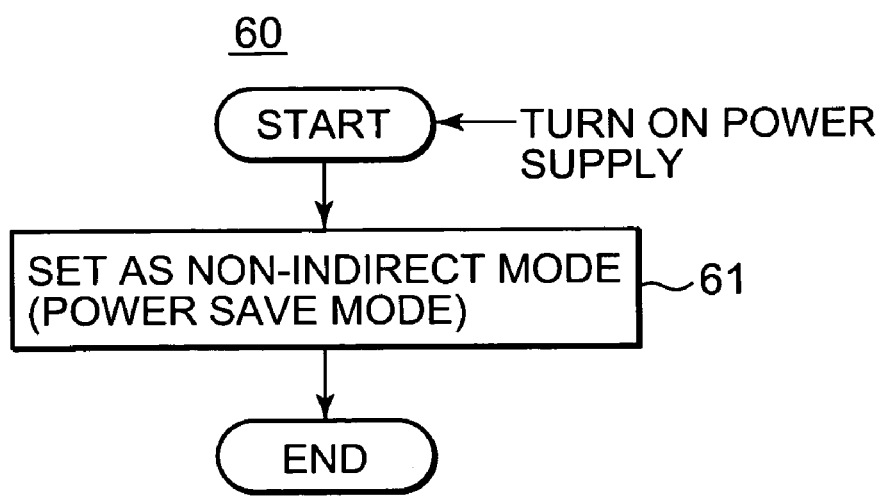
FIG. 7 is a flow chart showing an example of a starting process carried out by the repeater apparatus.

(2-1. Setup and Starting of Repeater Apparatus 300: FIGS. 6 and 7)

In the wireless LAN system as described above, with respect to the repeater apparatus 300, information about the system is set up in advance by the user by way of a method of using a web browser etc. like an access point of the existing wireless LAN system.

The control unit 310 of the repeater apparatus 300 checks whether the setup is made at the time of turning on a power supply to the repeater apparatus 300. An example of the setup check processing is shown in FIG. 6.

In this setup check process 50, at the time of turning on the power supply, the control unit 310 of the repeater apparatus 300 determines in step 51 whether or not information about the base apparatus and the monitor terminal is set up. When it is set up, the setup check process 50 is terminated, leaving the setup as it is. However, when it is not set up, the process moves to step 52 to cause a setup prompting LED of the LED display unit 334 as shown in FIG. 4 or 5 to blink.

A user looks at it and sets up the information about the base apparatus 100 and the monitor terminal 200, such as the MAC addresses of the base apparatus 100 and the monitor terminal 200 etc. by way of setup operation in the setup control unit 331 as shown in FIG. 4 or 5.

Further at the time of turning on the power supply, the control unit 310 of the repeater apparatus 300 performs a starting process as shown in FIG. 7. When it is determined that the information about the base apparatus and the monitor terminal is set up in step 51 of the setup check process 50, subsequently this starting processing is carried out.

In a starting process 60 of FIG. 7, the control unit 310 of the repeater apparatus 300 sets in step 61 the apparatus itself (repeater apparatus 300) as the non-indirect mode i.e. a situation where communication between the base apparatus 100 and the monitor terminal 200 is not relayed. Furthermore, at the same time it sets the apparatus itself (repeater apparatus 300) as a power save mode.

In power save mode, at a time when a beacon is transmitted from the base apparatus 100 at a certain time interval, or at a time when ACK (Acknowledge: positive response), a notice of mode change, etc. are transmitted from the repeater apparatus 300 to the base apparatus 100 or the monitor terminal 200, electric power is supplied to each unit of the repeater apparatus 300 including the wireless communications unit, assuming it to be in an awake state. At other timings or periods, electric power is supplied only to the minimum required functional units, such as the control unit 310, a dock circuit, and a timing circuit, assuming them to be in a doze state.

Thus, in the non-indirect mode, by causing it to be in the power save mode at the same time, power consumption of the repeater apparatus 300 can be reduced and power consumption of the whole wireless LAN system can be reduced.

(2-2. Process in Direct Communication Mode, and Change to Indirect Communication Mode: FIGS. 8-12)

As described above, when the repeater apparatus 300 is caused to be in the non-indirect mode (power save mode) and the wireless LAN system is in the direct communication mode, the monitor terminal 200, the base apparatus 100, and the repeater apparatus 300 perform processes as will be described below, respectively.

Figure 8:
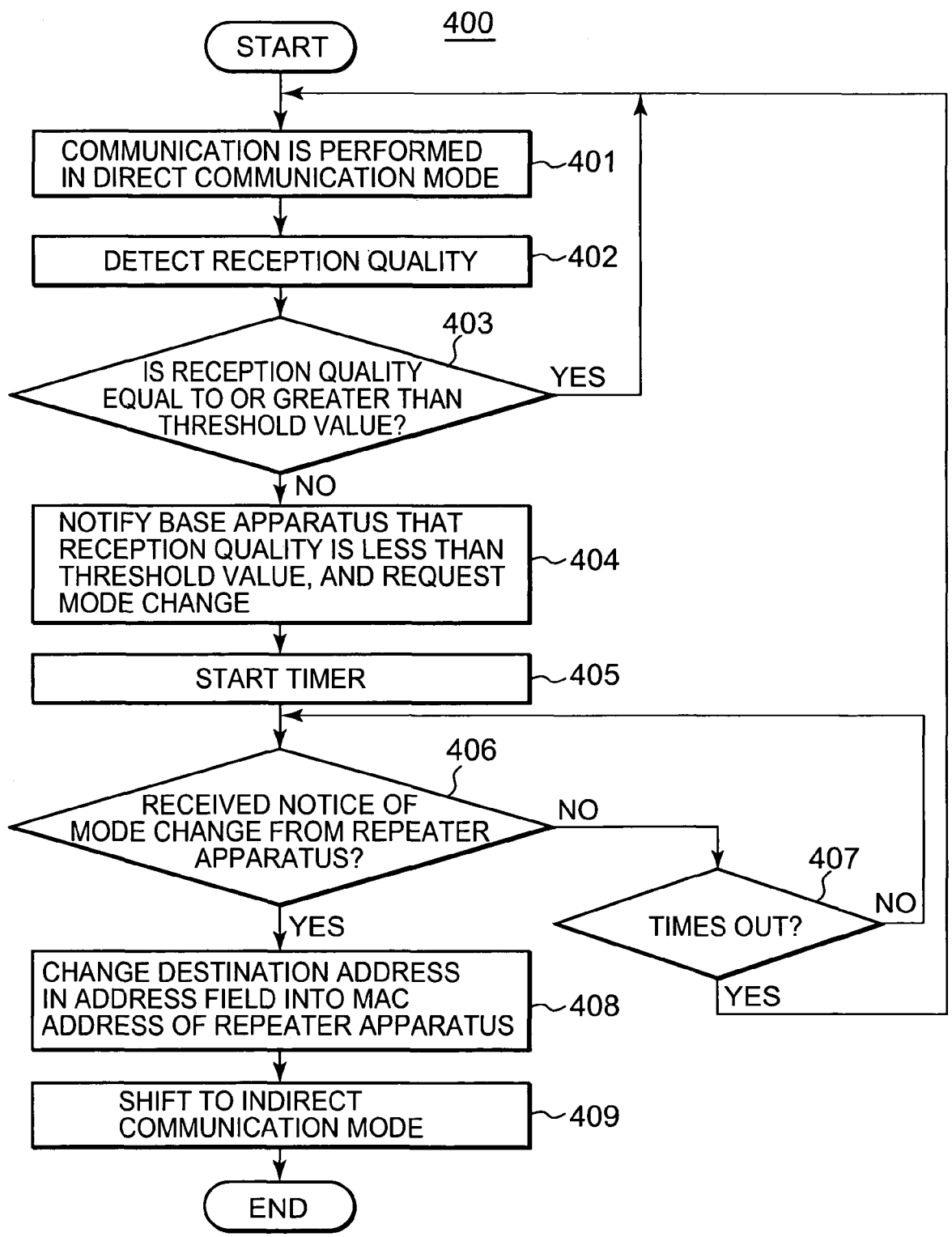
FIG. 8 is a flow chart showing an example of a process carried out by the monitor terminal in a direct communication mode.

<2-2-1. Process Carried Out by Monitor Terminal 200: FIG. 8>

An example of a process carried out by the monitor terminal 200 in the direct communication mode is shown in FIG. 8.

In this process 400, the monitor terminal 200 communicates with the base apparatus 100 in step 401 by way of the direct communication mode, detects in step 402 the reception quality of data received from the base apparatus 100, further determines in step 403 whether or not the detected reception quality is equal to or greater than a predetermined threshold value.

When the monitor terminal 200 exists in a position comparatively close to the base apparatus 100 in the area 1 as shown in FIG. 1, the data reception level in the monitor terminal 200 is high, and the reception quality is equal to or exceeds the threshold value. However, if the user moves the monitor terminal 200 to the vicinity of a boundary of the area 1 or out of the area 1, the data reception level in the monitor terminal 200 becomes low and the reception quality is less than the threshold value.

In step 403, when it is determined that the reception quality is equal to or greater than the threshold value, the control unit 210 of the monitor terminal 200 returns the process to step 401 to continue the communication in the direct communication mode.

In step 403, when it is determined that the reception quality is less than the threshold value, the control unit 210 of the monitor terminal 200 moves the process to step 404, to notify the base apparatus 100 that the reception quality is less than the threshold value and request a mode change.

This mode change request is transmitted not as a special frame but as a data frame as specified by the IEEE802.11 standard which is a wireless LAN standard similar to usual data transmitted and received between the base apparatus 100 and the monitor terminal 200.

As will be described later, if the mode change is requested by the monitor terminal 200, the base apparatus 100 requests a mode change of the repeater apparatus 300 by transmitting a beacon. If the mode change is requested by the base apparatus 100, the repeater apparatus 300 notifies the monitor terminal 200 and the base apparatus 100 of changing the mode.

If the base apparatus 100 is asked for the mode change in step 404, the control unit 210 of the monitor terminal 200, in step 405, starts a timer, and further moves the process to step 406, to determine whether or not the notice of the mode change is received from the repeater apparatus 300.

In step 406, when it is determined that the notice of the mode change is not received from the repeater apparatus 300, the control unit 210 of the monitor terminal 200 determines in step 407 whether or not the timer times out. If the timer does not time out, the process returns to step 406, where it is determined whether or not the notice of the mode change is received from the repeater apparatus 300.

In other words, the control unit 210 of the monitor terminal 200 waits for the notice of the mode change from the repeater apparatus 300 until a set-up period of time has elapsed. When the notice of the mode change is not received from the repeater apparatus 300 within the set-up period of time, the process returns from step 407 to step 401.

When the notice of the mode change is received from the repeater apparatus 300 within the set-up period of time, the control unit 210 of the monitor terminal 200 moves the process from step 406 to step 408, where a destination address in an address field is changed from the MAC address of the base apparatus 100 till then, into the MAC address of the repeater apparatus 300. The process moves to step 409, and shifts to the indirect communication mode.

By way of the above processes, the monitor terminal 200 is changed from the direct communication mode to the indirect communication mode.

Figure 9:
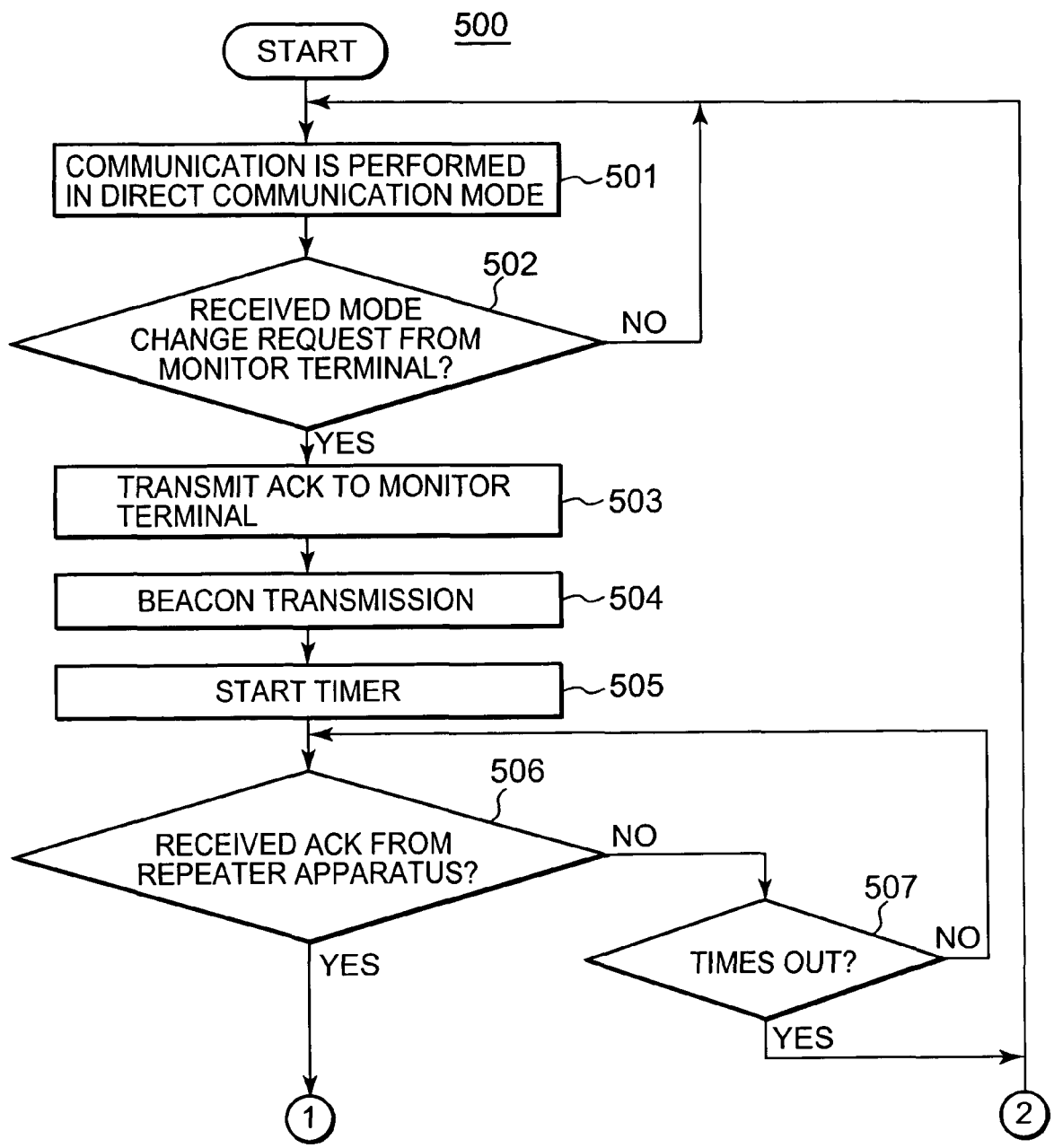
FIG. 9 is a flow chart showing part of an example of a processing carried out by the base apparatus in the direct communication mode.
Figure 10:
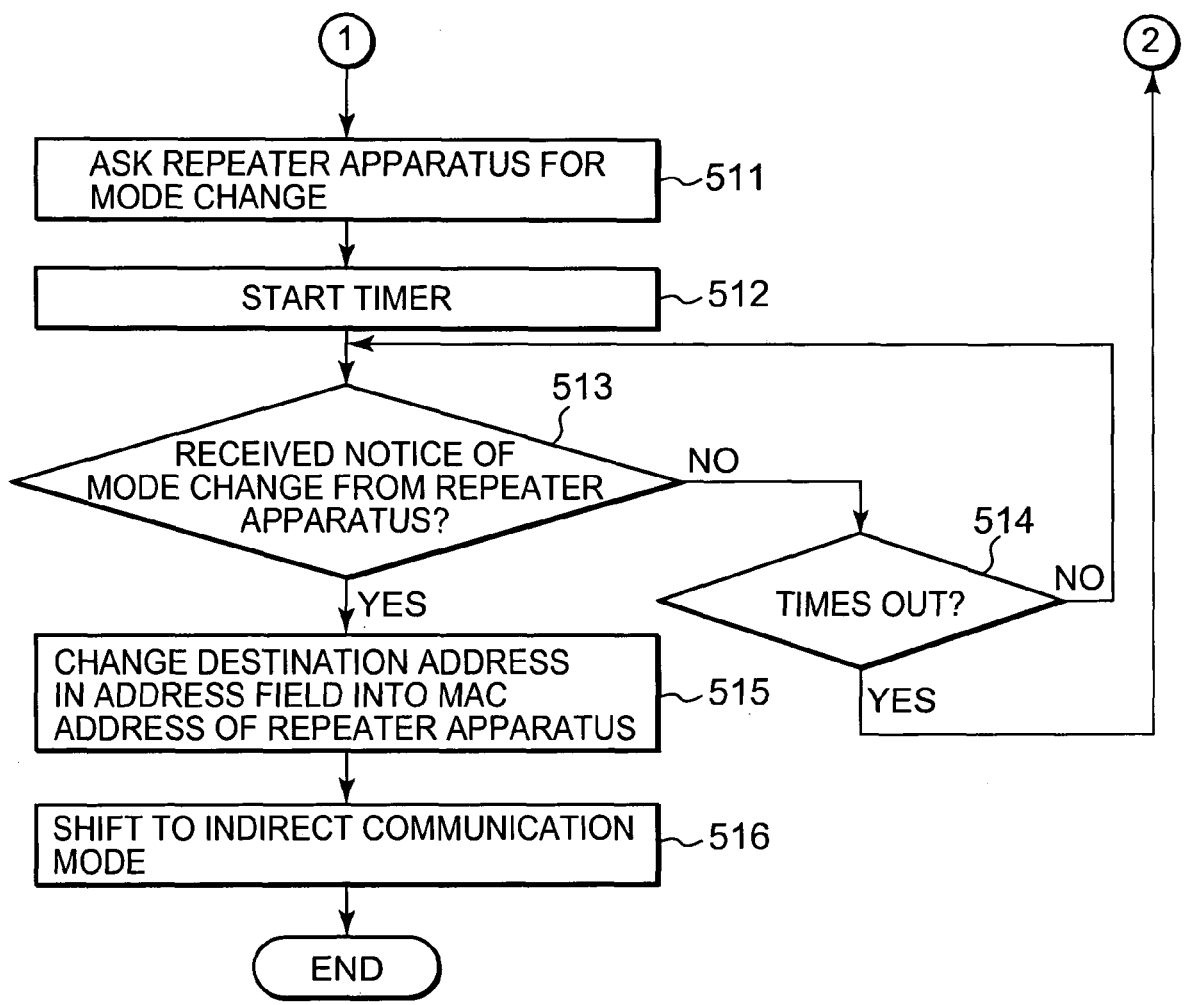
FIG. 10 is a flow chart showing part of the example of the process carried out by the base apparatus in the direct communication mode.

<2-2-2. Process Carried Out by Base Apparatus 100: FIGS. 9 and 10>

An example of a process carried out by the base apparatus 100 in the direct communication mode is shown in FIG. 9 and FIG. 10.

In this process 500, the base apparatus 100 communicates with the monitor terminal 200 in step 501 by way of the direct communication mode, and determines in step 502 whether or not the mode change request is received from the monitor terminal 200.

In step 502, when it is determined that the mode change request is not received from the monitor terminal 200, the control unit 110 of the base apparatus 100 returns the process to step 501 to continue the communication in the direct communication mode.

In step 502, when it is determined that the mode change request is received from the monitor terminal 200, the control unit 110 of the base apparatus 100 moves the process to step 503, transmits ACK to the monitor terminal 200, further moves the process to step 504, transmits a beacon, and notifies the repeater apparatus 300 by means of the beacon that the data destined for the repeater apparatus 300 exist.

Furthermore, the control unit 110 of the base apparatus 100, in step 505, starts the timer, and further moves the process to step 506, to determine whether or not ACK is received from the repeater apparatus 300. When ACK is not received, it is determined in step 507 whether or not the timer times out. When the timer does not time out, the process returns to step 506 where it is determined whether or not ACK is received from the repeater apparatus 300.

In other words, the control unit 110 of the base apparatus 100 waits for ACK from the repeater apparatus 300 until the set-up period of time has elapsed. When ACK is not received from the repeater apparatus 300 within the set-up period of time, the process returns from step 507 to step 501.

When ACK is received from the repeater apparatus 300 within the set-up period of time, the control unit 110 of the base apparatus 100 moves the process from step 506 to step 511 and requests a mode change of the repeater apparatus 300. This mode change request is also transmitted as a usual data frame within the beacon.

In step 511, asking the repeater apparatus 300 for the mode change, the control unit 110 of the base apparatus 100 starts the timer in step 512, further moves the process to step 513, and determines whether or not the notice of the mode change is received from the repeater apparatus 300.

In step 513, when it is determined that the notice of the mode change is not received from the repeater apparatus 300, the control unit 110 of the base apparatus 100 determines in step 514 whether or not the timer times out. If the timer does not time out, the process returns to step 513 and it is determined whether or not the notice of the mode change is received from the repeater apparatus 300.

In other words, the control unit 110 of the base apparatus 100 waits for the notice of the mode change from the repeater apparatus 300 until the set-up period of time has elapsed. When the notice of the mode change is not received from the repeater apparatus 300 within the set-up period of time, and the process returns from step 514 to step 501.

When the notice of the mode change is received from the repeater apparatus 300 within the set-up period of time, the control unit 110 of the base apparatus 100 moves the process from step 513 to step 515, the destination address in the address field is changed from the MAC address of the monitor terminal 200 till then, into the MAC address of the repeater apparatus 300, the process moves to step 516 to shift to the indirect communication mode.

The base apparatus 100 is switched from the direct communication mode to the indirect communication mode by way of the above process.

Figure 11:
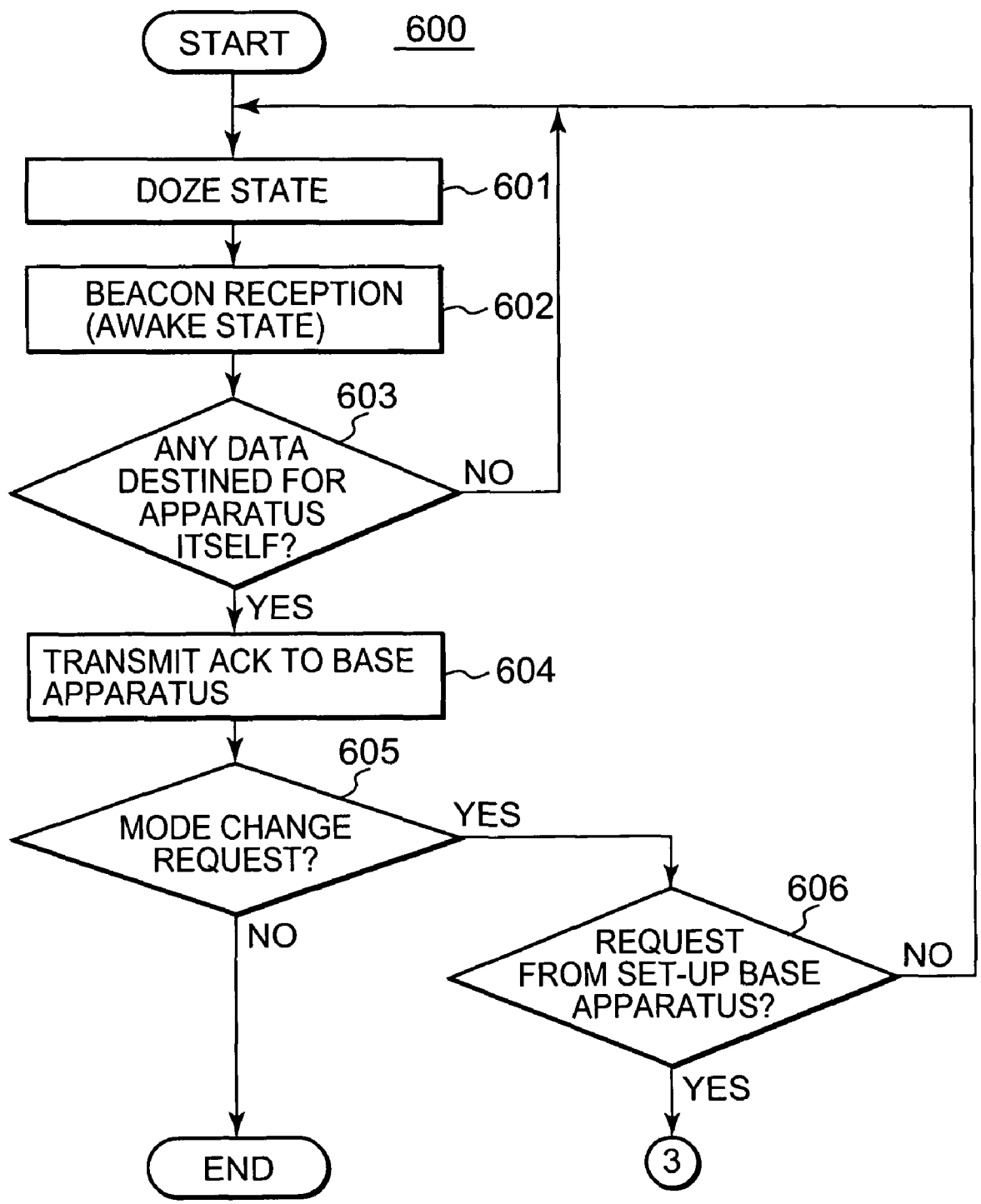
FIG. 11 is a flow chart showing part of an example of a process carried out by the repeater apparatus in the direct communication mode.
Figure 12:
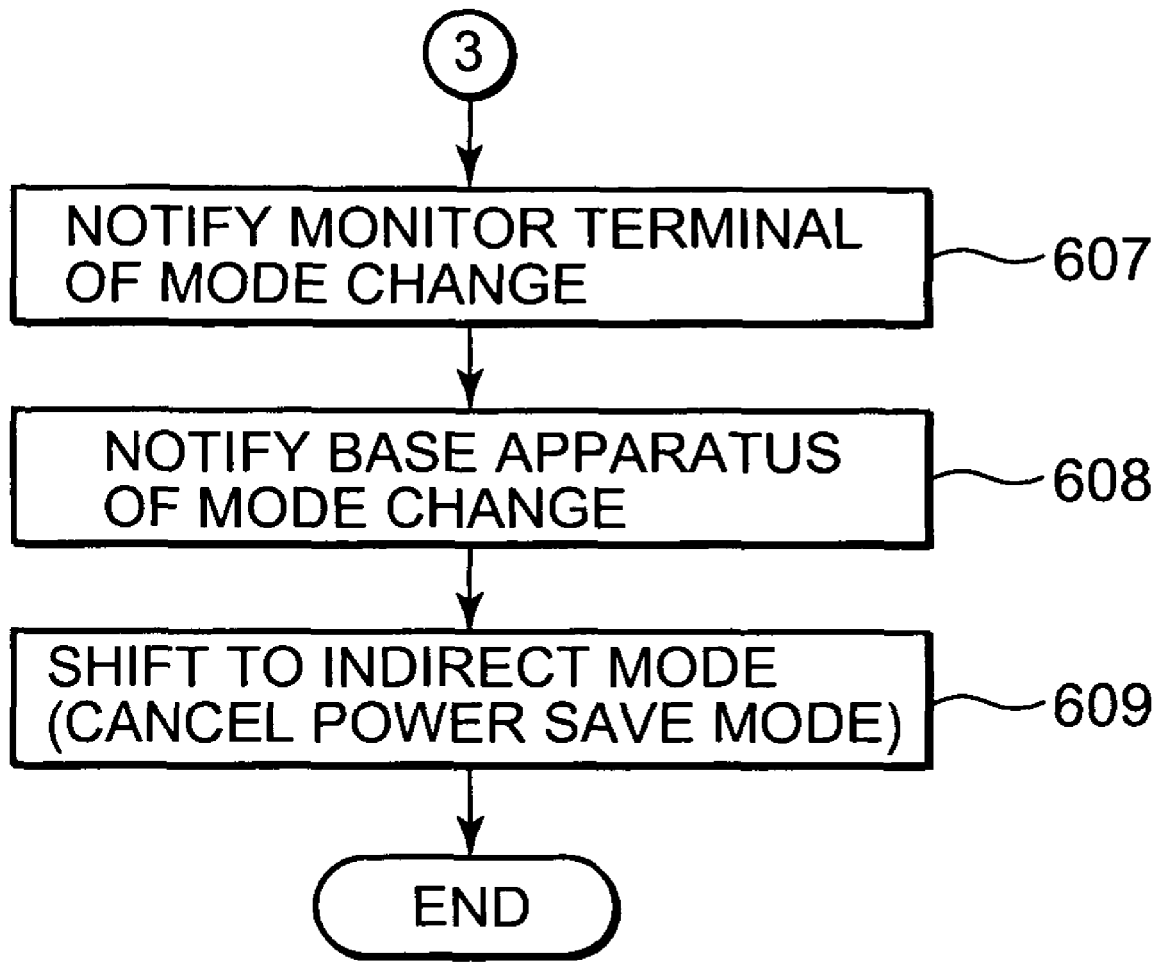
FIG. 12 is a flow chart showing part of the example of the process carried out by the repeater apparatus in the direct communication mode.

<2-2-3. Process Carried Out by Repeater Apparatus 300: FIGS. 11 and 12>

An example of a process carried out by the repeater apparatus 300 in the direct communication mode is shown in FIGS. 11 and 12. At this time, the repeater apparatus 300 is in the power save mode.

In this process 600, via the doze state in step 601, the repeater apparatus 300 receives the beacon transmitted from the base apparatus 100 in the awake state in step 602, further moves the process to step 603, and determines whether or not the data destined for the apparatus itself (repeater apparatus 300) are in the received beacon.

If there are no data destined for the apparatus itself within the received beacon, the repeater apparatus 300 returns from step 603 to step 601, to be in the doze state.

If there are the data destined for the apparatus itself within the received beacon, the control unit 310 of the repeater apparatus 300 moves the process from step 603 to step 604, transmits ACK to the base apparatus 100, further moves the process to step 605, and determines whether or not the data destined for the apparatus itself are for requesting the mode change.

When the data destined for the repeater apparatus 300 are not for requesting the mode change, the control unit 310 of the repeater apparatus 300 terminates the process 600 with respect to the mode change, and shifts to another processing routine.

When the data destined for repeater apparatus 300 are for requesting the mode change, the control unit 310 of the repeater apparatus 300 moves the process from step 605 to step 606, and determines whether or not the mode change request is one which is from the base apparatus (base apparatus 100) and set up in the apparatus itself (repeater apparatus 300). When it is not one from the set-up base apparatus (base apparatus 100), the process returns to step 601.

When the mode change request is one from the set-up base apparatus (base apparatus 100), the repeater apparatus 300 moves the process from step 606 to step 607, notifies the monitor terminal 200 that the mode is changed, and further moves the process to step 608. After notifying the base apparatus 100 of the change of the mode, it moves the process to step 609, cancels the power save mode (becomes the active mode), and shifts to the indirect mode.

The repeater apparatus 300 is switched from the non-indirect mode (power save mode) to the indirect mode (active mode) by way of the above process.

Figure 13:
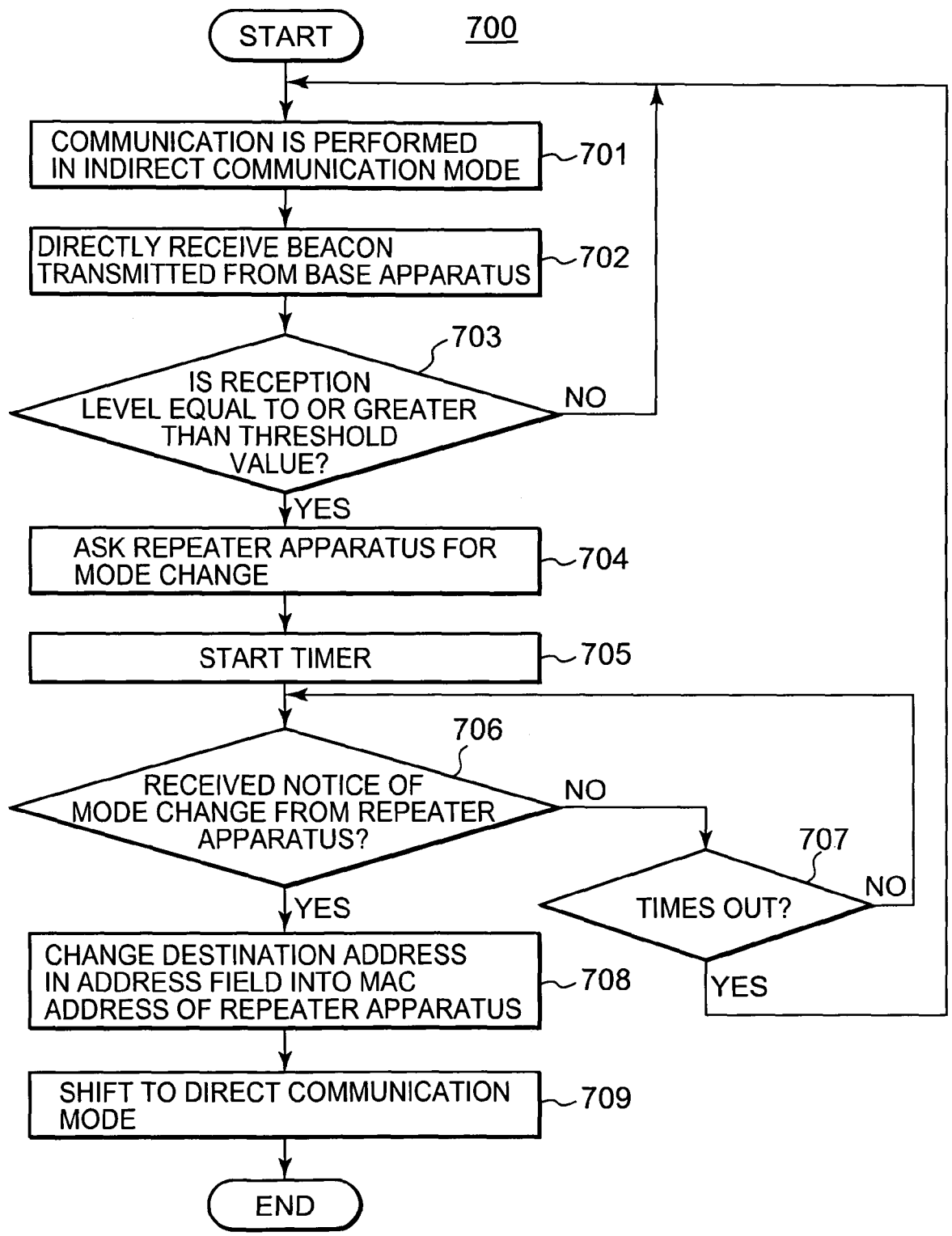
FIG. 13 is a flow chart showing an example of a process carried out by the monitor terminal in an indirect communication mode.
Figure 14:
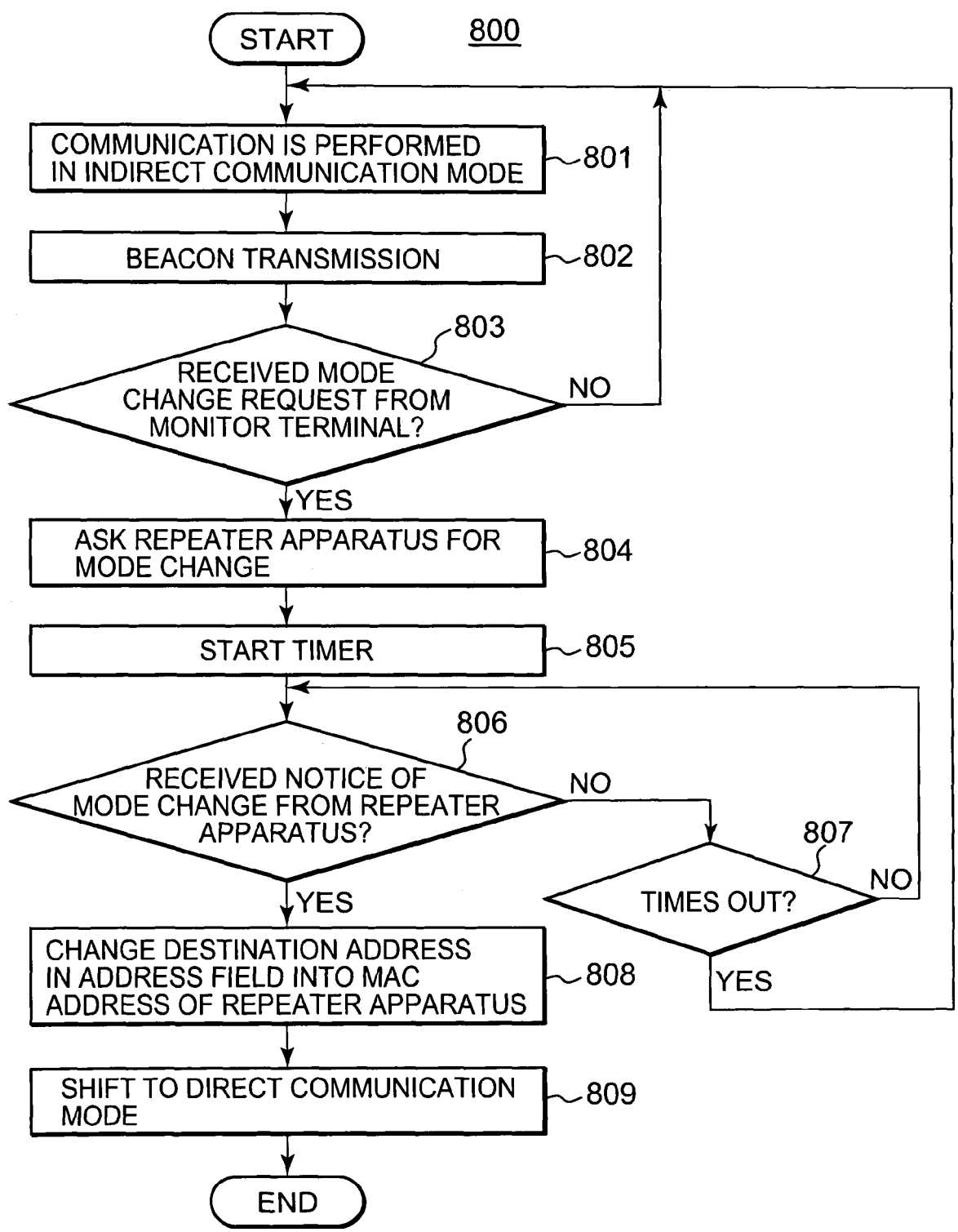
FIG. 14 is a flow chart showing an example of a processing carried out by the base apparatus in the indirect communication mode.
Figure 15:
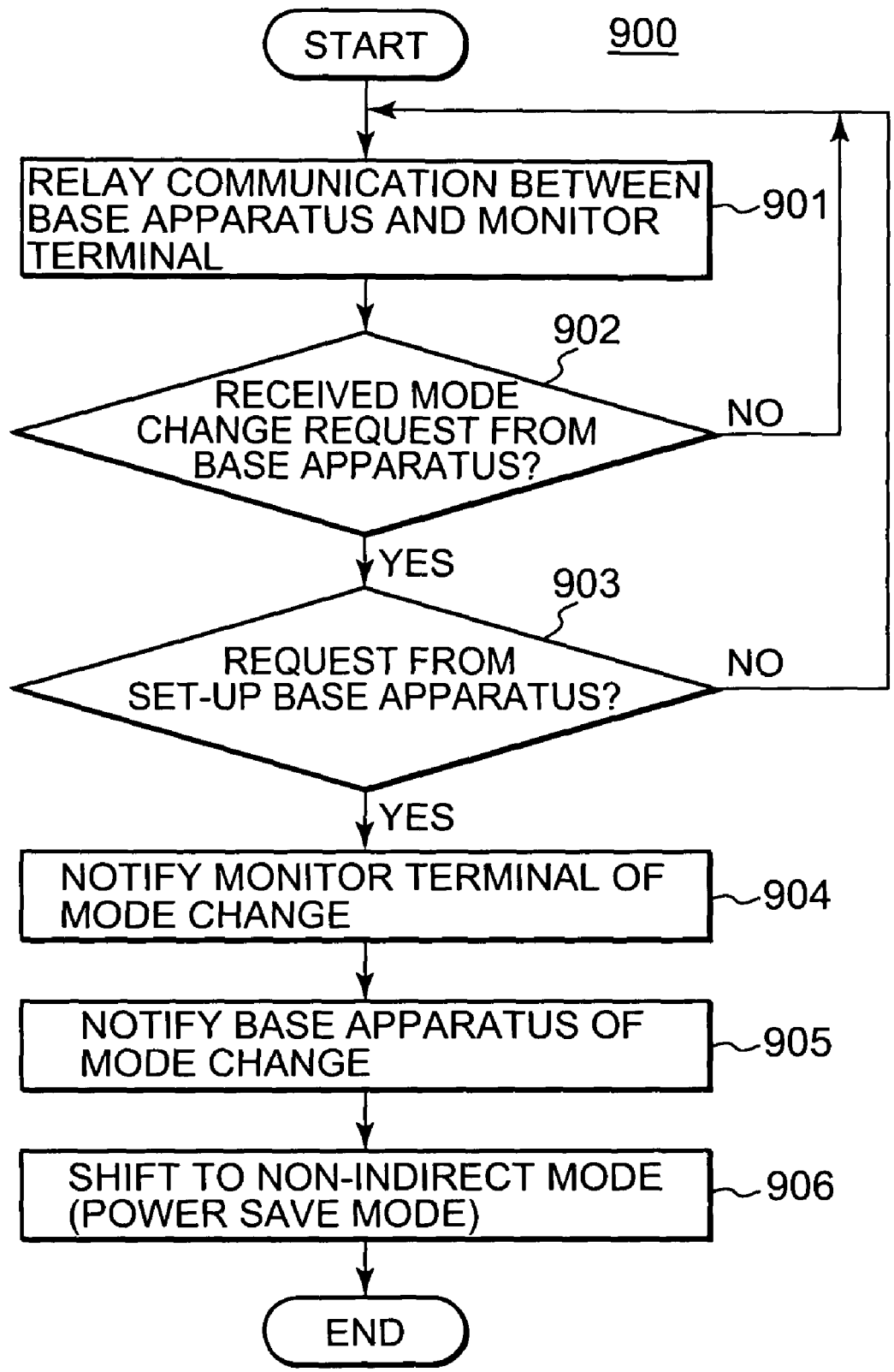
FIG. 15 is a flow chart showing an example of a process carried out by the repeater apparatus in the indirect communication mode.

(2-3. Process in Indirect Communication Mode and Change to Direct Communication Mode: FIGS. 13-15)

As described above, when the repeater apparatus 300 is caused to be in the indirect mode (active mode) and the wireless LAN system is in the indirect communication mode, the monitor terminal 200, the base apparatus 100, and the repeater apparatus 300 perform processes as will be described below, respectively.

<2-3-1. Process Carried Out by Monitor Terminal 200: FIG. 13>

An example of a process carried out by the monitor terminal 200 in the indirect communication mode is shown in FIG. 13.

In this process 700, the monitor terminal 200 communicates with the base apparatus 100 in step 701 via the repeater apparatus 300, directly receives the beacon transmitted from the base apparatus 100 in step 702, and determines in step 703 whether or not the reception level of the beacon is equal to or greater than the predetermined threshold value.

When the monitor terminal 200 exists outside the area 1 as shown in FIG. 1, the reception level when the monitor terminal 200 receives the beacon transmitted from the base apparatus 100 is low and it is less than the threshold value. However, if the user moves the monitor terminal 200 to the vicinity of the boundary of the area 1 or into the area 1, the reception level when the monitor terminal 200 receives the beacon transmitted from the base apparatus 100 increases and is equal to or greater than the threshold value.

In step 703, when it is determined that this beacon reception level is less than the threshold value, the control unit 210 of the monitor terminal 200 returns the process to step 701 to continue the communication in the indirect communication mode.

In step 703, when it is determined that the beacon reception level is equal to or greater than the threshold value, the control unit 210 of the monitor terminal 200 moves the process to step 704, asks the repeater apparatus 300 for the mode change, then starts the timer in step 705, further moves the process to step 706, and determines whether or not the notice of the mode change is received from the repeater apparatus 300.

In step 706, when it is determined that the notice of the mode change is not received from the repeater apparatus 300, the control unit 210 of the monitor terminal 200 determines whether or not the timer times out in step 707. If the timer does not time out, the process returns to step 706 and it is determined whether or not the notice of the mode change is received from the repeater apparatus 300.

In other words, the control unit 210 of the monitor terminal 200 waits for the notice of the mode change from the repeater apparatus 300 until the set-up period of time has elapsed. When the notice of the mode change is not received from the repeater apparatus 300 within the set-up period of time, the process returns from step 707 to step 701.

When the notice of the mode change is received from the repeater apparatus 300 within the set-up period of time, the control unit 210 of the monitor terminal 200 moves the process from step 706 to step 708, the destination address in the address field is changed from the MAC address of the repeater apparatus 300 till then, into the MAC address of the base apparatus 100, and the process moves to step 709 to shift to the direct communication mode.

The monitor terminal 200 is switched from the indirect communication mode to the direct communication mode by way of the above process.

<2-3-2. Process Carried Out by Base Apparatus 100: FIG. 14>

An example of a process carried out by the base apparatus 100 in the indirect communication mode is shown in FIG. 14.

In this process 800, the base apparatus 100 communicates with the monitor terminal 200 in step 801 via the repeater apparatus 300, transmits a beacon in step 802, and determines in step 803 whether or not the mode change request is received via the repeater apparatus 300 from the monitor terminal 200.

In step 803, when it is determined that the mode change request from the monitor terminal 200 through the repeater apparatus 300 is not received, the control unit 110 of the base apparatus 100 returns the process to step 801 to continue the communication in the indirect communication mode.

In step 803, when it is determined that the mode change request from the monitor terminal 200 through the repeater apparatus 300 is received, the control unit 110 of the base apparatus 100 moves the process to step 804, asks the repeater apparatus 300 for the mode change, then starts the timer in step 805, further moves the process to step 806, and determines whether or not the notice of the mode change is received from the repeater apparatus 300.

In step 806, when it is determined that the notice of the mode change is not received from the repeater apparatus 300, the control unit 110 of the base apparatus 100 determines in step 807 whether or not the timer times out. If the timer does not time out, the process returns to step 806 and it is determined whether or not the notice of the mode change is received from the repeater apparatus 300.

In other words, the control unit 110 of the base apparatus 100 waits for the notice of the mode change from the repeater apparatus 300 until the set-up period of time has elapsed. When the notice of the mode change is not received from the repeater apparatus 300 within the set-up period of time, the process returns from step 807 to step 801.

When the notice of the mode change is received from the repeater apparatus 300 within the set-up period of time, the control unit 110 of the base apparatus 100 moves the process from step 806 to step 808, the destination address in the address field is changed from the MAC address of the repeater apparatus 300 till then, into the MAC address of the monitor terminal 200, and the process moves to step 809 to shift to the direct communication mode.

The base apparatus 100 is switched from the indirect communication mode to the direct communication mode by way of the above process.

<2-3-3. Process Carried Out by Repeater Apparatus 300: FIG. 15>

An example of a process carried out by the repeater apparatus 300 in the indirect communication mode is shown in FIG. 15.

In this process 900, the repeater apparatus 300, in step 901, relays the communication between the base apparatus 100 and the monitor terminal 200, and determines in step 902 whether or not the mode change request is received from the base apparatus. The mode change request from the base apparatus 100 is transmitted in step 804 of FIG. 14.

In step 902, when it is determined that the mode change request is not received from the base apparatus, the control unit 310 of the repeater apparatus 300 returns the process to step 901 to continue the relay of the communication between the base apparatus 100 and the monitor terminal 200.

In step 902, when it is determined that the mode change request is received from the base apparatus, the control unit 310 of the repeater apparatus 300 moves the process to step 903, and determines whether or not the mode change request is a mode change request from the base apparatus (base apparatus 100) set up in the apparatus itself (repeater apparatus 300). When it is not the mode change request from the set-up base apparatus (base apparatus 100), the process returns to step 901.

When the mode change request is the mode change request from the set-up base apparatus (base apparatus 100), the repeater apparatus 300 moves the process from step 903 to step 904, notifies the monitor terminal 200 that the mode is changed, and further moves the process to step 905. After notifying the base apparatus 100 of the change of the mode, it moves the process to step 906, shifts to the non-indirect mode to be in the power save mode.

The repeater apparatus 300 is switched from the indirect mode (active mode) to the non-indirect mode (power save mode) by way of the above process.

The present invention contains subject mater related to Japanese Patent Application No. JP2005-213858 filed in the Japanese Patent Office on Jul. 25, 2005, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. Repeater apparatus for relaying communication signals between a base apparatus and a monitor terminal via a wireless LAN system operable in a direct communication mode wherein the base apparatus communicates directly with the monitor terminal, and in an indirect communication mode wherein the base apparatus communicates with the monitor terminal through the repeater apparatus, said repeater apparatus comprising:

a transceiver through which said base apparatus communicates with said monitor terminal when said LAN system operates in said indirect communication mode;

an indirect mode request detector for detecting a mode change request from said base apparatus transmitted in response to a mode change request from said monitor terminal when a reception quality of data received from said base apparatus by said monitor terminal is lower than a threshold value while said LAN system is operating in said direct communication mode;

a direct mode request detector for detecting a mode change request from said monitor terminal transmitted when said monitor terminal receives from said base apparatus a beacon, different from said communication signals, that is at least equal to said threshold value when said LAN system is operating in said indirect communication mode; and control means responsive to said indirect mode request detector to set said repeater apparatus to an indirect mode whereby said communication channel relays communication signals between said base apparatus and said monitor terminal, said control means being responsive to said direct mode request detector to set said repeater apparatus to a non-indirect mode whereby said communication channel does not relay communication signals between said base apparatus and said monitor terminal.

2. The repeater apparatus of claim 1, wherein said control means responds to said indirect mode request detector if said base apparatus is registered with the repeater apparatus.

3. The repeater apparatus of claim 2, wherein said control means responds to said direct mode request detector if said monitor terminal is registered with the repeater apparatus.

4. The repeater apparatus of claim 1, wherein said control means sets the repeater apparatus to a power save mode when changing said repeater apparatus from said indirect mode to said non-indirect mode, and cancels said power save mode when changing said repeater apparatus from said non-indirect mode to said indirect mode.

5. The repeater apparatus of claim 1, wherein said communication channel comprises a first wireless communication unit for communicating with said base apparatus and a second wireless communication unit for communicating with said monitor terminal.

* * * * *